(12) United States Patent
Suzuki (10) Patent No.: US 6,381,092 B1
(45) Date of Patent: Apr. 30, 2002

(54) SPACER RINGS TO COMPENSATE FOR DISK WARPAGE

(75) Inventor: Shoji Suzuki, San Jose, CA (US)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 09/480,872

(22) Filed: Jan. 10, 2000

(51) Int. Cl.[7] .............................................. G11B 17/08
(52) U.S. Cl. .................................................. 360/98.08
(58) Field of Search ........................... 360/98.07, 98.08, 360/98.02, 99.01, 99.04, 99.05, 99.08, 99.12; 369/263

(56) References Cited

U.S. PATENT DOCUMENTS

| | | | | |
|---|---|---|---|---|
| 3,980,810 A | * | 9/1976 | Tinet | 369/261 |
| 4,003,091 A | * | 1/1977 | Wright | 360/224 |
| 5,161,075 A | * | 11/1992 | Kanai et al. | 360/99.04 |
| 5,285,343 A | * | 2/1994 | Tanaka et al. | 360/131 |
| 5,381,287 A | * | 1/1995 | Kawazoe et al. | 360/234.3 |
| 5,504,646 A | * | 4/1996 | Tanaka et al. | 360/135 |
| 5,828,519 A | | 10/1998 | Sasa | 360/99.12 |
| 5,923,498 A | | 7/1999 | Moir et al. | 360/98.08 |
| 5,969,902 A | * | 10/1999 | Okumura et al. | 360/99.08 |
| 6,115,213 A | * | 9/2000 | Ikeda et al. | 360/99.08 |
| 6,125,098 A | * | 9/2000 | Osawa | 369/266 |
| 6,157,515 A | * | 12/2000 | Boutaghou | 360/99.08 |
| 6,212,157 B1 | * | 4/2001 | Yabuki et al. | 369/263 |
| 6,215,617 B1 | * | 4/2001 | Okumura et al. | 360/99.12 |

FOREIGN PATENT DOCUMENTS

| | | | |
|---|---|---|---|
| JP | 57-200622 | * | 5/1984 |
| JP | 57-200623 | * | 5/1984 |
| JP | 57-200624 | * | 5/1984 |
| JP | 57-200625 | * | 5/1984 |
| JP | 08-229991 A | * | 9/1996 |

* cited by examiner

Primary Examiner—David L. Ometz
Assistant Examiner—Franklin D. Altman, III
(74) Attorney, Agent, or Firm—Blakely Sokoloff Taylor & Zafman LLP (57) ABSTRACT

A disk drive having spacers to compensate for disk warpage is described. The spacers are positioned on opposite sides of a disk with each spacer contacting the disk a different radial position relative to the center of the disk. The offset contact areas result in displaced moments on the disk, with respect to each other, when the spacers are clamped to the disk. The moments generated by the clamped spacers provide a torque on a warped disk to improve its flatness.

10 Claims, 6 Drawing Sheets

SPACER RINGS TO COMPENSATE FOR DISK WARPAGE

FIELD OF THE INVENTION

This invention relates to the field of disk drives and, more specifically, to components used in disk drives.

BACKGROUND

A disk drive system typically consists of one or more magnetic recording disks and control mechanisms for storing data within concentric tracks on a disk. The reading and writing of data is accomplished with a head that is used to alter the properties of the magnetic layer. The head is "flown" over the disk's surface on a thin air bearing. As is well known, the actual read/write head is typically attached to a slider body having an air bearing surface that provides the necessary aerodynamic performance. Herein, the term "head" may be used to denote both the head and slider body, depending on the context.

The head is positioned over a desired data track using an actuator connected by a suspension arm to the head. The actuator moves the head in a radial direction to the desired track. A spindle motor rotates the disk to position the head at a particular location along the desired track. Spindle motor assemblies typically include a rotatable spindle hub that is carried by a fixed spindle shaft securely mounted to the disk drive's housing. One or more disks are positioned on the spindle hub with spacers provided between adjacent disks to allow for head to be positioned between the disks. The disks are clamped on the spindle hub with a disk clamp.

Head flight results from the compressed air between the head (air bearing) and the rotating disk. This develops a boundary layer of air carried by the rotating disk, above its surface, that lifts the head away from the disk in opposition to a loading force from the suspension arm. Therefore, it is important to maintain precise clearance between the head and the disk's surface. As such, the flatness of a disk may affect the flying characteristics of the head.

Drive manufacturers specify a flatness required for disks to operate within their system. Disks are typically manufactured to meet such disk flatness specifications. In general, the flatter the disk, the better its performance within a disk drive. The flatness of a disk may be defined in terms of the difference between the highest and the lowest point on a disk, referred to as total indicated run-out (TIR). Many disk drives currently require TIR to be less than 15 microns for a disk 0.8 millimeters (mm) thick. A warped or bent (i.e., concave or convex) disk may vary the spacing between the head and the disk at different positions and, thereby, cause undesirable disk contact with the flying head during operation of the drive. Successive head contact with the disk surface wears through protective coatings on the disk that may lead to corrosion of the magnetic layer and, thus, corruption of data stored therein. Moreover, severe head contact with the disk may cause the drive to crash and possibly render the drive non-functional.

Typically, prior drive systems rely on the use of a disk that is manufactured to be substantially flat to maintain precise clearance between the head and the disk's surface. The drive's spindle assembly uses a disk clamping mechanism that provides a uniform clamping force along its area of contact with the disk to avoid distortion of the disk. One problem such a drive system is that the disk clamp may be limited only to use with a substantially flat disk. The disk drive may not be able to utilize disks that are manufactured outside a TIR specification. Such a disk drive system may not be desirable because of the higher cost of using a substantially flat disk in comparison to the use of a warped disk that may be less expensive.

SUMMARY OF THE INVENTION

The present invention pertains to a method and apparatus for compensating disk warpage. In one embodiment, the apparatus may include a disk and a plurality of spacers coupled to the disk to provide unbalanced moments on the disk.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which.

DETAILED DESCRIPTION

In the following description, numerous specific details are set forth such as examples of specific materials, shapes, dimensions, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The apparatus described herein may be implemented with a disk drive system having one or more disks. It should be noted that the description of the apparatus in relation to a single disk is only for illustrative purposes and is not meant to be limited only to single disk drives.

In one embodiment, the disk drive described herein includes spacers to compensate for disk warpage. The spacers are positioned on opposite sides of a disk with each spacer contacting the disk a different radial position relative to the center of the disk. The different contact areas result in displaced moments on the disk with respect to each other when the spacers are clamped to the disk. The moments generated by the clamped spacers provide a torque on a warped disk to improve its flatness.

Figure 1:
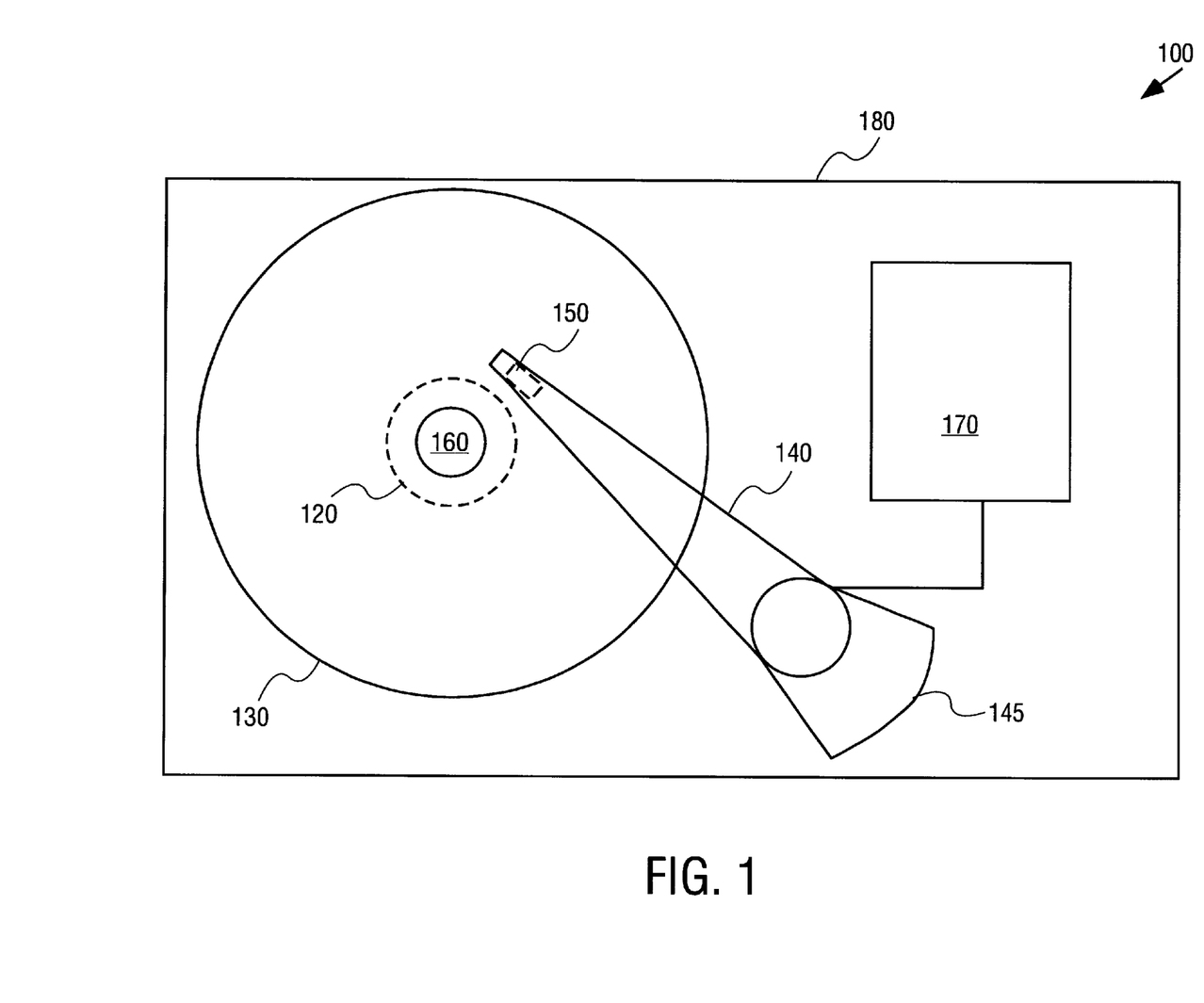
FIG. 1 illustrates one embodiment of a disk drive having spacers.

FIG. 1 illustrates one embodiment of a disk drive having spacers. Disk drive 100 may include one or more disks (e.g., disk 130) to store data. Data may be stored within concentric tracks on either side of disk 130. The reading and writing of data is accomplished with head 150 "flown" adjacent the surface of disk 130, on a thin air bearing. Actuator 145 moves suspension arm 140 and, thus, head 150 in a radial direction to a desired track.

130 resides on a spindle motor hub. The spindle motor hub is rotatably coupled to a fixed spindle shaft 160 that is mounted to the disk drive housing 180. A spindle motor (not shown) rotates the hub and, thereby, disk 130 to position head 150 at a particular location along a desired disk. Spacers (e.g., spacer 120) may be positioned on both sides of disk 130. One function of the spacers may be to provide space for head 150 to be moved between disks. The position of head 150 relative to disk 130 may be controlled by position control circuitry 170. In one embodiment, spacer 120 may also operate to compensate for warpage of disk 130, as discussed in detail below.

Head 150 is "flown" by the compressed air between head 150 (air bearing) and the rotating disk 130. This develops a boundary layer of air carried by the rotating disk 130, above its surface, that lifts head 150 away from disk 130 in opposition to a loading force from suspension arm 140. A relatively uniform clearance between head 150 and the disk's 130 surface will allow for consistent flight of head 150. As such, the flatness of disk 130 may affect the flying characteristics of the head. If disk 130 has a concave or a convex surface, it may cause a variation in the spacing between head 150 and the disk's surface at different radial positions and, thereby, cause undesirable disk contact with the flying head during operation of disk drive 100.

Figure 2:
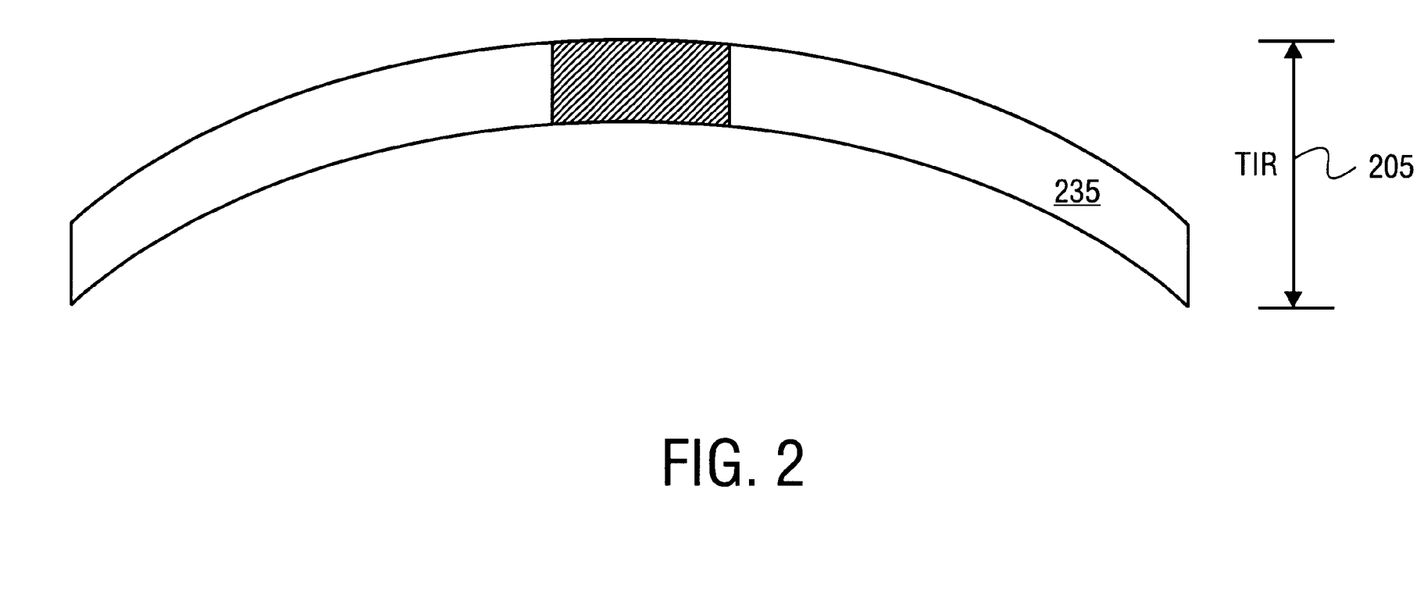
FIG. 2 illustrates one embodiment of disk warpage.

In one embodiment, disk 130 may be required to be substantially flat, after assembly in disk drive 100, to maintain an approximately uniform head clearance across the radius of the disk. The flatness of a disk may defined by the distance 205 difference between the highest and the lowest point on a disk 235, as illustrated in FIG. 2. Distance 205 may be referred to as the total indicated run-out (TIR) of disk 235. The TIR of disk 235 may be affected by many factors during the manufacture of the disk.

For example, a disk may consist of a substrate having one or more layers deposited onto it. The substrate may be stamped out of a sheet of material and heat treated under pressure to create a blank. The blank may then be subjected to grinding, additional heating, and polishing. Any one step, or combination thereof, may contribute to the warping of the substrate. Additional heating during subsequent layer depositions may also contribute to further warping of the disk. The particular steps described above, however, are only for illustrative purposes and are not meant to limit the invention to correction of disk warpage caused only by those steps. The spacers described below may be used to compensate for disk warpage regardless of the process by which the disk is warped.

After fabrication, a disk may be tested for, among other things, flatness to determine if it falls within a disk drive manufacturer's specification. Even though a fabricated disk may fall outside a drive manufacturer's disk flatness specification, the disk may still be used in a drive if it's flatness is corrected to be within specification during its operation in the drive. By controlling the position of forces applied to the disk's surface when it is assembled in a drive, a particular moment (i.e., bending force) may be generated on the disk. This moment may operate to improve the flatness of a warped disk.

Figure 3:
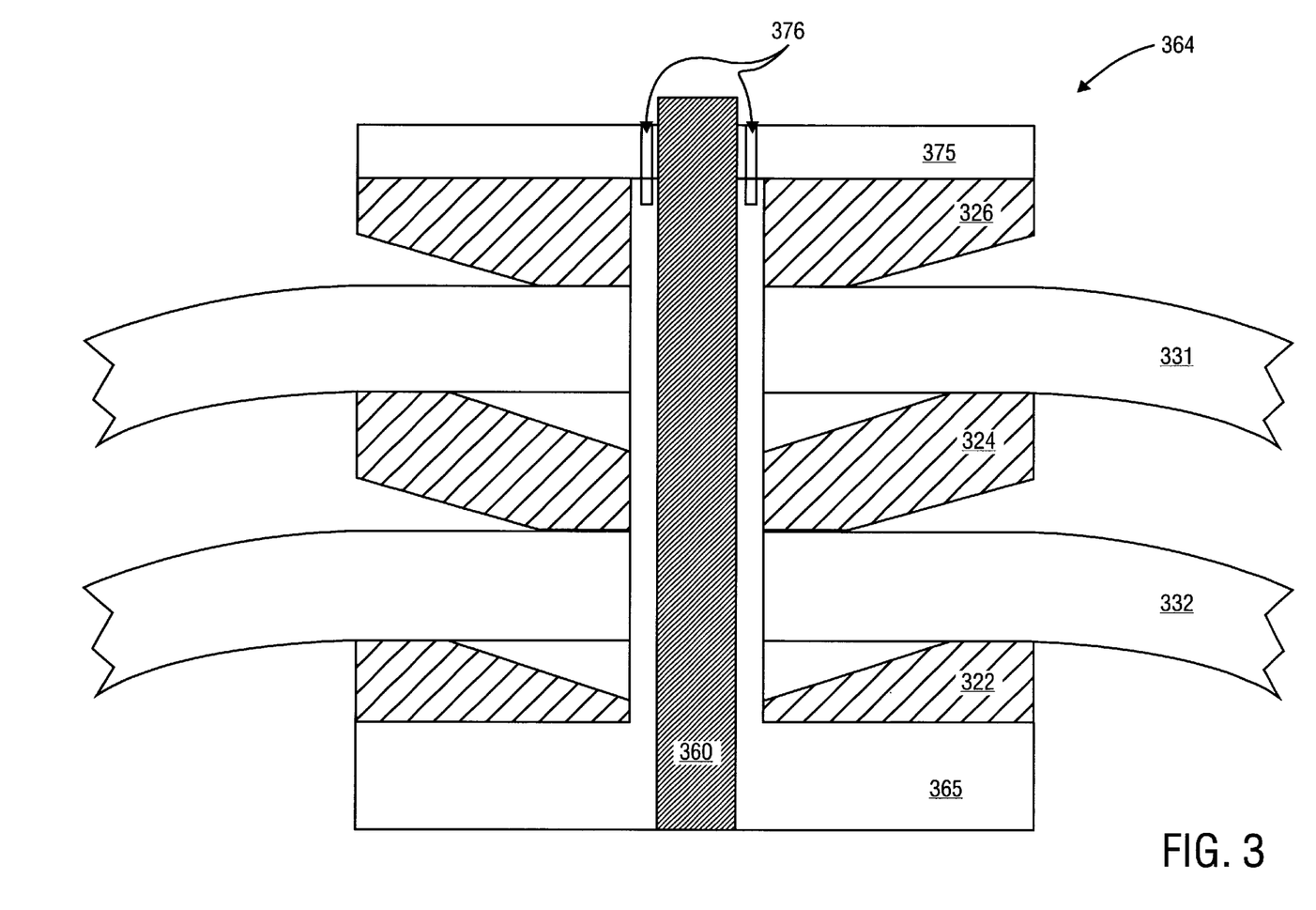
FIG. 3 illustrates a cross section of one embodiment of a spindle assembly.

FIG. 3 illustrates a cross section of one embodiment of a spindle assembly. In one embodiment, spindle assembly 364 includes a spindle shaft 360, a rotatable spindle hub 365, disks 331 and 332, and spacers 322, 324, and 326. In an alternative embodiment, spindle assembly 364 may have more or less than two disks with corresponding spacers on each side of a disk.

Disks 331 and 332 reside on spindle motor hub 365. Spindle motor hub 365 is rotatably coupled to a fixed spindle shaft 360 that may be mounted to disk drive housing. A spindle motor (not shown) rotates disks 331 and 332 to position a head at a particular location along the desired disk track as discussed above in relation to FIG. 1.

Spacer 324 is positioned between disks 331 and 332. Spacers 326 and 322 are positioned on the outsides of disks 331 and 332, respectively. In alternative embodiment, the outer spacers 326 and 322 may be incorporated into other components. For example, spacer 322 may be integrated into spindle hub 365 and spacer 326 may be integrated into clamp 375.

Disks 331 and 332 may be clamped to spindle hub 365 by disk clamp 375 using screws. Clamp 375 is used to contain the components of the spindle assembly. In one embodiment, screws 375 may be set with approximately a 1.5 inch-pound (in-lb) torque per screw. The clamping force translates into an applied torque that affects the degree to which a disk deflects, as discussed below in relation to FIGS. 4A and 4B.

The force may be varied to accommodate different configurations of disks and spacers with the force preferably in the range of 1 to 3 in-lb. In an alternative embodiment, other securing means and forces may be used, for example, a spring mechanism or a heat shrink mechanism. Securing means are well known in the art; accordingly, a more detailed description is not provided.

Figure 4A:
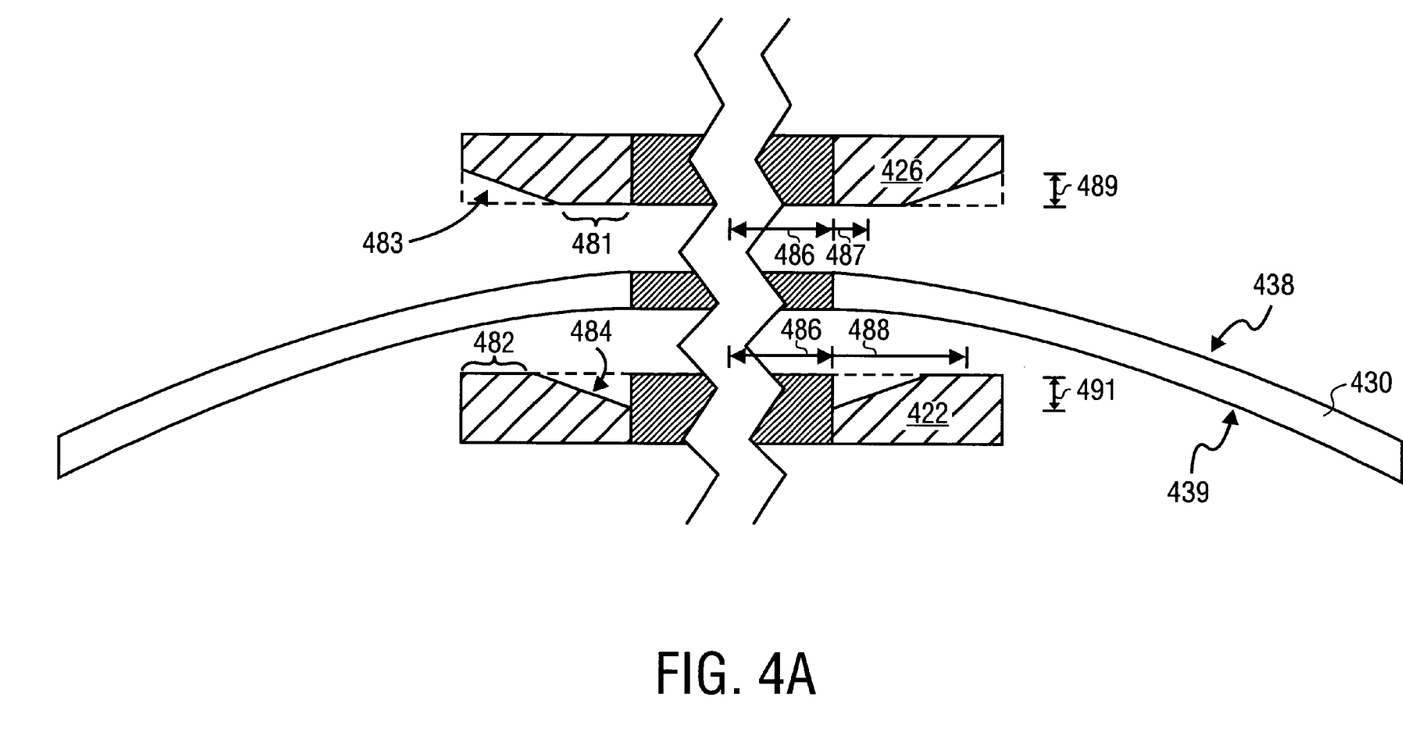
FIG. 4A illustrates an exploded cross-sectional view of one embodiment of a spindle assembly.

FIG. 4A illustrates an exploded cross-sectional view of one embodiment of a spindle assembly. In one embodiment, spacers 422 and 426 may be configured to reduce the warpage of disk 430. Spacers 422 and 426 may be constructed from a rigid material, for examples, metal and plastic. The spacers may be manufactured according to the particular specifications of a spindle hub to rest around its periphery. In one embodiment, spacers 422 and 426 are ring shaped. In an alternative embodiment, spacers 422 and 426 may have another configurations to reside on a side of a disk as required by the particular design of a spindle assembly. The surfaces of spacers 422 and 426 may be beveled differently to produce contact areas 482 and 481 at different radial positions on disk 430.

Spacer 426 has a contact area 481 near its inner diameter for contact with the convex side 438 of disk 430. The outer diameter area 483 of the surface of spacer 426 is sloped to prevent contact with disk 430, prior to that of area 481, when coupled to disk 430. This forms a gap 489 between outer diameter area 483 of spacer 426 and disk 430 when spacer 426 and disk 430 are first brought into contact with each other. In one embodiment, gap 489 may be present after spacer 426 is coupled to disk 430. In an alternative embodiment, gap 489 may not be present after coupling due to undulations that may reside on surface 438.

The finishing and polishing processes used to manufacture disk 430, along with the material properties of the disk, may result in its surfaces 438 and 439 having ripples, or undulations. In addition to affecting the flying stability of the drive's head, the undulations may result in variations of the thickness of disk 430. In one embodiment, without gap 489, the presence of undulations on surface 438 may create contact with spacer 426 in the outer diameter area 483 prior to that of area 481 when spacer 426 is placed against surface 438. In order to prevent outer diameter area 483 from contacting disk 430 prior to contact area 481, gap 489 should be made larger than the undulations on surface 438 in the region adjacent outer diameter area 483.

Regardless of whether gap 483 remains after spacer 426 coupling with disk 430, the outer diameter area 483 may have other surface contours (e.g., curved) and may but cut at other angles greater than zero, as long as initial contact is made at contact area 481. In an alternative embodiment, spacer 426 does not include outer diameter area 483 such that the diameter of spacer 426 is defined by contact area 481.

In one embodiment, the depth of gap 489 may be approximately in the range of 10 to 200 microns. In an alternative embodiment, the resulting gap 489 may have another dimension based on the undulations on surface 438 of disk 430.

Spacer 422 has a contact area 482 near its outer diameter for contact with the concave side 439 of disk 430. The inner diameter area 484 of the surface of spacer 422 is sloped to prevent initial contact with disk 430 during coupling similar to that described above for spacer 426. This results in a gap 491 formed between inner diameter area 484 of spacer 422 and disk 430 when spacer 422 and disk 430 are first brought into contact with each other.

In alternative embodiments, inner diameter area 484 may have other surface contours (e.g., curved) and may but cut at other angles greater than zero similar to that discussed above for spacer 426. The configuration of gap 491 is such that inner diameter area 484 is prevented from contacting disk 430 prior to contact area 482.

In one embodiment, the depth of gap 491 may be approximately in the range of 10 to 200 microns. In an alternative embodiment, gap 491 may have other dimensions based on the undulations on surface 439 of disk 430. In yet another embodiment, either or both inner diameter area 484 and outer diameter area 483 may have contact with disk 430 after coupling, as long as initial contact is made at contact areas 482 and 481, respectively.

The approximate middles of contact areas 481 and 482 have different radial distances 487 ("b") and 488 ("a"), respectively, relative to the center of disk 430. In one embodiment, for example, with an aluminum substrate disk having a are diameter of 95 mm and a thickness of 0.8 mm, the radial distances 486, 487, and 488 are 12.5 mm, 13 mm, and 15 mm, respectively. In alternative embodiments, the radial distances may have other dimensions as determined by a disk's thickness, diameter, and type of material.

Figure 4B:
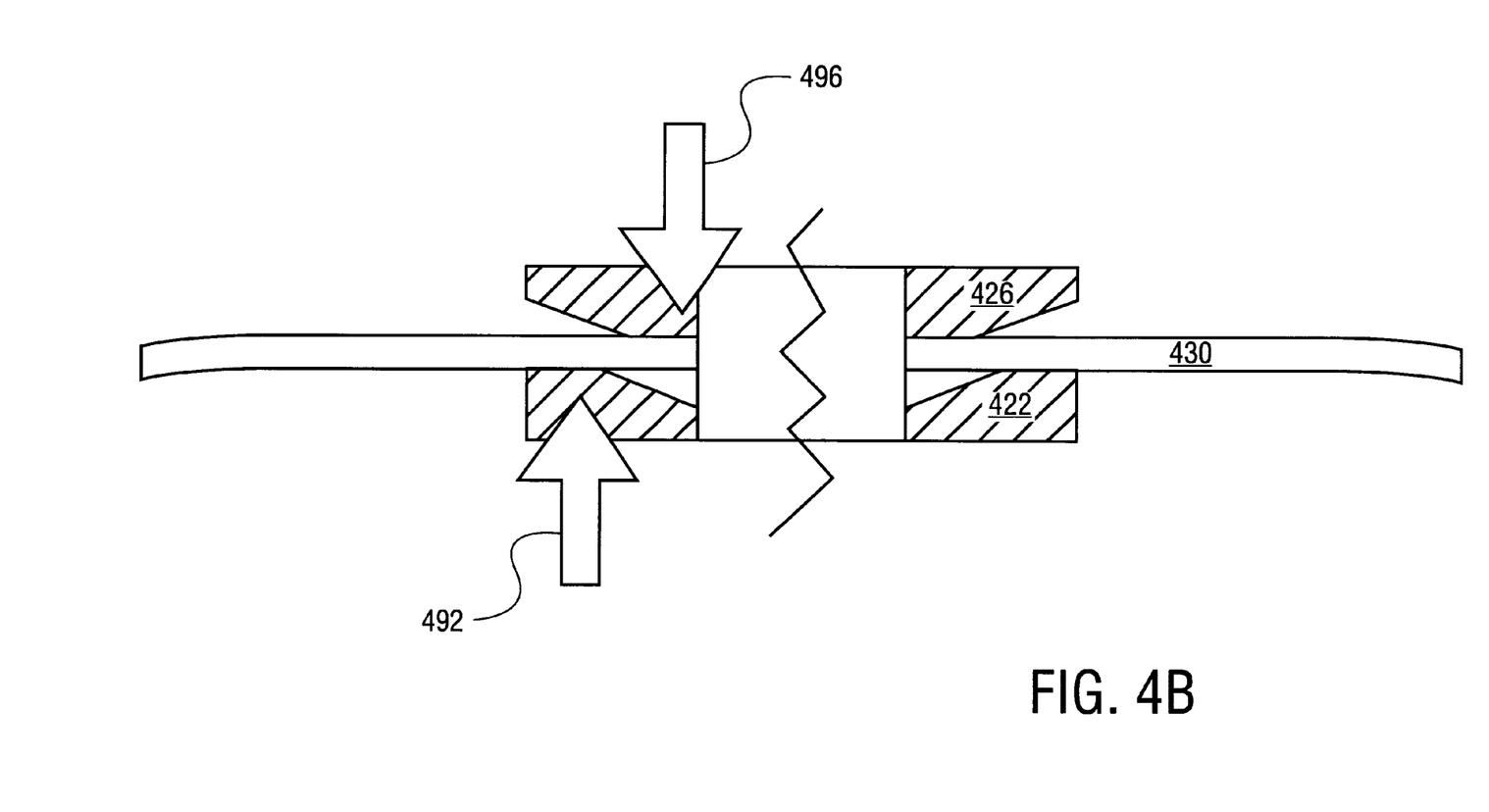
FIG. 4B illustrates one embodiment of the forces generated by spacers.

The radial distance of the contact area on the convex side of a disk is configured to be less than radial distance of the contact area on the concave side of a disk. As such, when disk 430 is clamped between spacers 426 and 422, disk 430 experiences unbalanced moments 496 and 492, as illustrated in FIG. 4B. The moments generated by spacers 426 and 422 generate a torque on disk 430 to deflect the disk in opposition to its warpage. This is designed to reduce a disk's warpage and produce a disk that is substantially flatter than it was prior to coupling with spacers 426 and 422.

In one embodiment, the maximum deflection of the disk $\omega_{max}$ between the inner and outer contact areas 482 and 481 may be approximated by the following equation:

$$\omega_{\max} = (\omega)_{r=b} = \alpha \frac{Pa^2}{Eh^3}$$

where, $\alpha$ is the deflection constant, P is the clamping force as discussed above in relation to FIG. 3, h is the thickness of the disk, and E is the module of elasticity of the disk's material. The derivation of $\alpha$ and E is well known in the art; accordingly, a more detailed description is not provided. In one embodiment, the displaced contact areas 481 and 482 may compensate for a disk's warpage up to approximately 30 microns for a disk having a diameter of approximately 95 mm and a thickness of approximately 0.8 mm.

Figure 5:
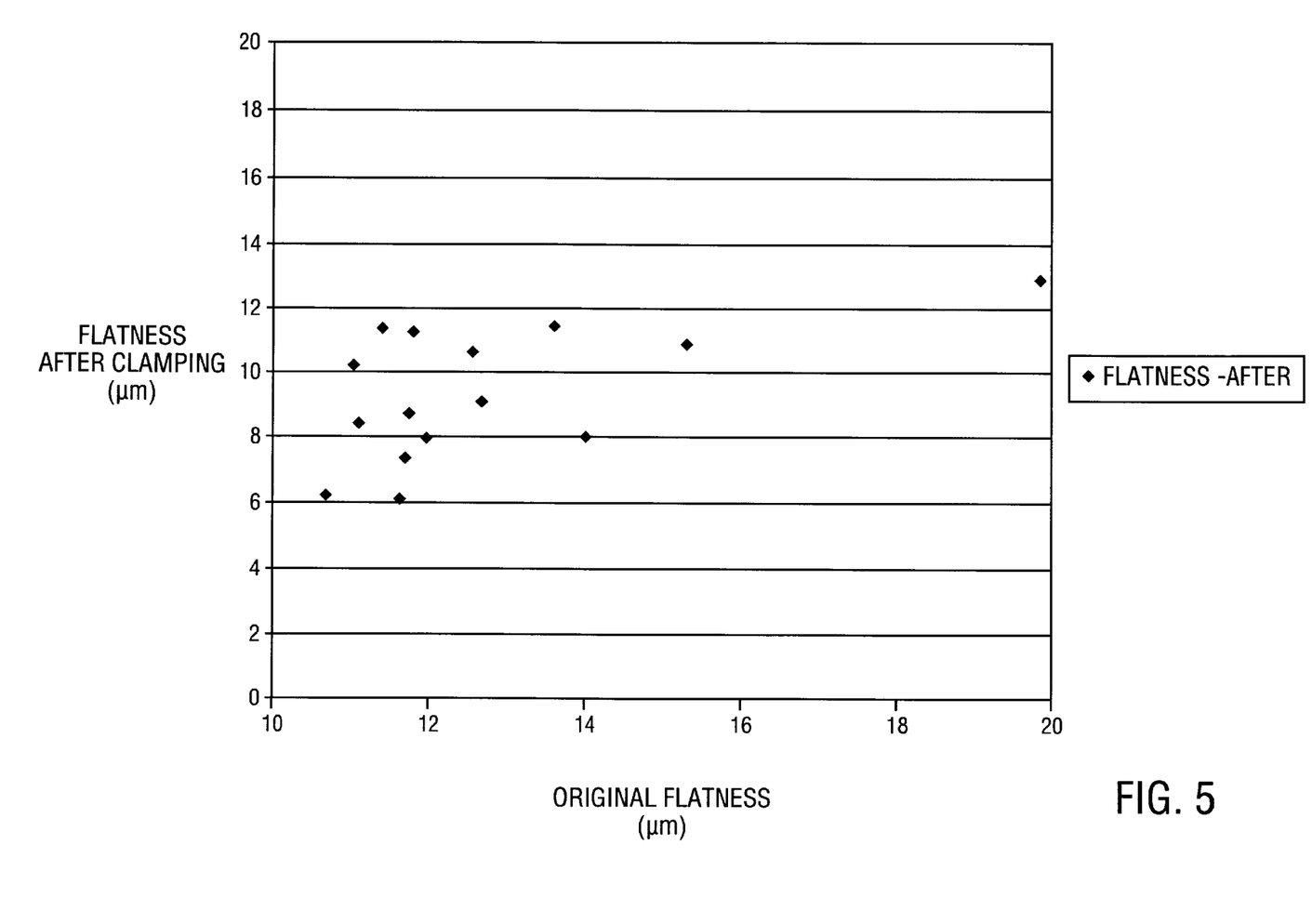
FIG. 5 is a graph showing measure values of one embodiment of disk flatness before and after clamping with spacers according to one embodiment of the present invention.

FIG. 5 is a graph showing measure values of one embodiment of disk flatness before and after clamping with spacers. It should be noted that FIG. 5 provides only exemplary results and is not meant to limit the degree to which flatness may be achieved.

In one embodiment, the above described spacers may be used with disks having a TIR outside of a drive manufacturer's specification for a particular system. For example, if a disk drive manufacturer's TIR specification is 10 microns for a 0.8 millimeter thick disk, spacers may be used with a disk having a TIR greater than 10 microns prior to assembly. These dimensions, however, are only exemplary and are not meant to be limiting. The spacers may be used with a disk having other TIR and thickness dimensions.

In an alternative embodiment, the above described spacers may be used with a disk having a TIR within drive system's specifications to further reduce the warpage of the disk. By further reducing the TIR of a disk, a disk drive's performance and reliability may be improved.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A spindle assembly, comprising:
    a disk having a concave side and a convex side; and
    a plurality of spacers having beveled surfaces coupled to the disk to provide unbalanced moments on the disk, wherein the plurality of spacers comprise:
        a first spacer coupled to the convex side of the disk at a first contact area; and
        a second spacer coupled to the concave side of the disk at a second contact area, the first contact area being at a smaller radial distance from a center of the disk than the second contact area.

2. The spindle assembly of claim 1, wherein a first gap is formed between the first spacer and the disk by the beveled surface of the first spacer and wherein a second gap is formed between the second spacer and the disk by the beveled surface of the second spacer.

3. The spindle assembly of claim 2, wherein the gap is approximately in the range 10 to 200 microns.

4. The spindle assembly of claim 1, further comprising a clamp to couple the disk to the plurality of spacers and wherein the unbalanced moments provided by the plurality of spacers generate a torque on the disk to improve a flatness of the disk.

5. The spindle assembly of claim 2, wherein a clamping force is applied to the disk and the plurality of spacers in the range of 1 to 3 in-lb.

6. The spindle assembly of claim 1, wherein the disk has a warpage and wherein the unbalanced moments operate to deflect the disk in opposition to the warpage.

7. A disk drive, comprising:
    a disk having a first radial position and a second radial position;
    a first spacer coupled to the disk, the first spacer having an initial area of contact with the disk at the first radial position; and
    a second spacer coupled to the disk, the second spacer having an initial area of contact with the disk at the second radial position, the first and the second spacers to generate unbalanced moments on the disk based on the first and the second radial positions, wherein the disk has a concave side and a convex side, wherein the first radial position is less than the second radial position, the first spacer coupled to the convex side of the disk, the second spacer coupled to the concave side of the disk.

8. The disk drive of claim 7, wherein the unbalanced moments generate a torque on the disk to improve a flatness of the disk.

9. The disk drive of claim 7, wherein the disk is warped prior to coupling to the first and the second spacers and wherein the disk is substantially flattened after coupling to the first and the second spacers.

10. A spindle assembly, comprising:

a disk having a concave side and a convex side; and a plurality of spacers coupled to the disk to provide unbalanced moments on the disk, wherein the plurality of spacers comprise:
  a first spacer coupled to the convex side of the disk at a first contact area; and
  a second spacer coupled to the concave side of the disk at a second contact area, the first contact area being at a smaller radial distance from a center of the disk than the second contact area.

* * * * *